United States Patent [19]

Sandler et al.

[11] 4,302,340

[45] Nov. 24, 1981

[54] FLAME RETARDANT POLYOL COMPOSITIONS AND THEIR PREPARATION

[75] Inventors: Stanley R. Sandler, Springfield; Mabel M. Chen, Marple, both of Pa.

[73] Assignee: Pennwalt Corporation, Philadelphia, Pa.

[21] Appl. No.: 64,656

[22] Filed: Aug. 8, 1979

[51] Int. Cl.³ .................................................. C09K 3/28
[52] U.S. Cl. .................................... 252/609; 428/921; 521/164; 521/906
[58] Field of Search ................ 252/8.1, 609; 521/164, 521/906; 260/553 R

[56] References Cited

U.S. PATENT DOCUMENTS

| | | | |
|---|---|---|---|
| 2,523,470 | 9/1950 | Kropa et al. | 252/8.1 |
| 3,314,902 | 4/1967 | Wismer et al. | 252/8.1 |
| 3,345,338 | 10/1967 | Merten et al. | 521/164 X |
| 3,440,259 | 4/1969 | Bungs | 252/8.1 X |
| 4,152,497 | 5/1979 | Miano et al. | 521/164 |

*Primary Examiner*—Richard D. Lovering

[57] ABSTRACT

A flame retardant polyol composition is prepared by reacting chloral with a compound selected from the group consisting of urea, diethanolurea, dipropanolurea, thiourea, sulfamide and mixtures thereof in the presence of a polyhydroxy composition having 2 to 8 hydroxy groups. These compositions are useful for preparing flame retardant polyurethane foams.

12 Claims, No Drawings

FLAME RETARDANT POLYOL COMPOSITIONS AND THEIR PREPARATION

BACKGROUND OF THE INVENTION

This invention relates to a flame retardant polyol composition and the method for preparing the composition.

U.S. Pat. No. 4,152,497 disclose that certain reaction products of chloral with urea, thiourea or sulfamide are useful as reactive flame retardants for polyurethane foam. The disclosed mono or dichloral urea compositions are solid products and therefore cannot be conveniently handled by foam manufacturers. In addition when the disclosed preparations are prepared in water the product then must be filtered, dried and redissolved in the polyol before use in the polyurethane foam. The acid catalyst used in the preparation also has to be removed by washing and this creats a disposal problem because a large volume of highly acidic wash water is generated. Another problem with this solid product is that substantially all of the water has to be removed prior to dissolving it in the polyurethane polyols since water interferes with the foaming reaction. This necessitates a lengthy drying period. When tetrahydrofuran is used as the solvent, it has to be removed by distillation in order to isolate the product; this also creates a disposal problem. In addition, tetrahydrofuran is flammable and dangerous to handle in plant equipment making this process undesirable commercially.

The present invention overcomes the disadvantages of the prior art solid compositions by being a liquid composition wherein the polyol is the solvent. The reaction products of the present invention are prepared directly in the polyol under anhydrous conditions. Hence, there is no need for filtering, washing or drying the product prior to using it in the manufacture of polyurethane foams. Another advantage of the present invention is that the reaction time is very short (i.e., on the average of less than five hours) as opposed to that of the prior art wherein up to three days were needed for completion of the reaction. Another important feature is that in the present invention no acid catalyst is required, thus eliminating a serious waste disposal problem.

STATEMENT OF THE INVENTION

The present invention is directed to a process for preparing an anhydrous, liquid, flame retardant composition in a polyol comprising reacting 0.5 to 2.0 moles of chloral with 0.5 to 1.5 moles of a member selected from the group consisting of urea, diethanolurea, dipropanolurea, thiourea, sulfamide and mixtures thereof in the presence of a polyhydroxy composition having 2 to 8 hydroxy groups.

This invention also comprehends the compositions prepared by the above-mentioned process.

DETAILED DESCRIPTION OF THE INVENTION

It has now been discovered that highly effective flame retardant polyols can be simply prepared by reacting chloral with either urea, diethanolurea, dipropanolurea, thiourea or sulfamide directly in the chosen polyol to give a unique combination of flame retardant ingredients. Since the reaction is done under anhydrous conditions and since no solids are formed, there is no need to filter, dry and redissolve the product thus significantly reducing manufacturing costs. The process has the added advantage of being rapid, thereby further improving the economics.

The compositions of this invention are effective as flame retardants for rigid polyurethane foam, rigid polyurethane/isocyanurate copolymer foam, hot cure flexible polyurethane foams, and high resiliency flexible polyurethane foam.

The production of polyurethanes is a well-known commercial process. Briefly, the process involves the reaction of a di or polyisocyanate with a polyfunctional compound that may contain hydroxyl, amino, or carboxyl groups, i.e., a polyfunctional compound containing active hydrogens. The most common type of polyurethanes are formed by the reaction of toluene diisocyanate (TDI) or polymethylene polyphenylisocyanate or mixtures thereof with polyfunctional hydroxyl compounds.

The liquid flame retardant compositions of this invention may be blended with all of the components used in preparing polyurethane foam or with other additives such as stabilizers, plasticizers, pigments, antioxidants, flame retardants, smoke suppressants, etc.

The compositions described in this invention may be prepared by the reaction of urea, diethanolurea, dipropanolurea, thiourea, or sulfamide, and mixtures thereof, with chloral in a polyol. Briefly, urea, diethanolurea, dipropanolurea, thiourea, or sulfamide is stirred with the polyol at a temperature between 20° and 120° C. while chloral is added over a period of 5–120 minutes. The resulting reaction mixture is heated for an addition 0–5 hours, cooled and packaged.

The preferred concentration range of the chloral reaction product with urea, diethanolurea, dipropanolurea, thiourea or sulfamide in the polyol is 5–80 percent of the total anhydrous liquid composition. Accordingly, the polyol composition is in the range of 95 to 20 percent of the total anhydrous, liquid flame retardant composition.

Representative polyols which may be used in the above reactions include polyhydroxy compounds containing 2 to 8 hydroxy groups and polyether polyols, polyester polyols and mixtures thereof. However, the polyether polyols are preferred. The polyether polyols include any suitable polyhydroxy compound containing 2 to 8 hydroxy groups reacted with an alkylene oxide. The polyhydroxy compounds include ethylene glycol, propylene glycol, isobutylene glycol, 2,3-butanediol, 1,4-dihydroxy-2-butane, 1,4-dihydroxycyclohexane, 2-butyne-1,4-diol, 1,1-dihydroxyoctadecane, glycerin, trimethylolpropane, sorbitol, mannitol, inositol, erythritol, pentaerythritol, sucrose, dextrose, methyl glucoside, 1,4-dimethylol benzene, glycerin monochlorohydrin, diglycerol, methyl ether of glycerin, mixtures thereof, and condensates thereof with alkylene oxides, e.g. ethylene oxide, propylene oxide and butylene oxide.

The carbohydrate-based polyols especially preferred are particularly those of dextrose, sucrose and their oxyalkylated products. If desired, a portion of the carbohydrate-based polyhydroxy compound can be replaced by another compound having at least two reactive hydrogen atoms such as alkylamines, alkylene polyamines, cyclic amines, amides and polycarboxylic acids. Suitable alkylamines and alkylene polyamines include methylamine, ethylamine, propylamine, butylamine, hexylamine, ethylenediamine, 1,6-hexanediamine, diethylenetriamine and the like. Cyclic amines include compounds such as piperazine. Suitable amides are acetamide, succinamide and benzenesulfonamide. The polycarboxylic acids include adipic, succinic and glutaric acids.

Sucrose/amine polyols that have a hydroxyl number of 400–600 are particularly preferred. Some typical commercially available polyols are Mobay's Multranols E-9221, 9214; Union Carbide's Niax SAS-528; PPG's Selectrofoam 6406; and Jefferson's Thanol R-350X.

The preferred polyol flame retardant compositions of this invention are prepared by reacting 0.5 to 1.5 moles of urea, diethanolurea, dipropanolurea, thiourea, sulfamide or combinations thereof with 0.5 to 2.0 moles of chloral in a sucrose/amine polyol. The polyol composition is an anhydrous liquid and has many components that provide the flame retardancy characteristics.

The reaction of urea, diethanolurea, dipropanolurea (or combinations thereof) with chloral in a sucrose/amine polyol is especially preferred.

The compositions of this invention can be added to the polyol component used in preparing polyurethane foam in the amount of up to 100 percent of the total polyol. The preferred level of the polyol flame retardant composition of the present invention for high-resiliency polyurethane foam is 1 to 15 percent of the polyol and for rigid polyurethane foam is 10–100 percent of the total polyol.

The following examples illustrate the invention and are not to be taken as a limitation thereof.

Polyurethane foams described in the following examples are made by use of the anhydrous liquid flame retardant polyol of this invention, and optionally the use of additional polyols followed by addition of catalysts, surfactant, blowing agent (optional) and isocyanate. The components in the foams in the examples are in the measure-units of parts by weight unless otherwise indicated or a non measure unit item such as an index. This mixture is stirred by a high-speed mixer and is poured into a mold. (In the case of high-resiliency foam the mold is clamped shut.) After the reaction is completed, the foam is removed and aged at room temperature for at least seven days (conventional "hot cure" foams are cured at 100° C. for ½ hour prior to aging). The flame retardant properties are evaluated using ASTM D-1692-74, ASTM D-2863-74, and ASTM STP 422, ASTM E-662 (NFPA 258-T).

EXAMPLE 1

1474.0 g of Multranol E-9221 polyol (Mobay) and 122.7 g (2.05 moles) of urea are added to a 3-liter 3-neck flask equipped with a thermometer, an addition funnel, condenser and a mechanical stirrer. The temperature of the flask is raised to 85° C.; then 603.3 g (4.1 moles) of chloral is added over a 70 minute period while keeping the temperature between 85°–93° C. The mixture is heated for an additional 2 hours in order to complete the reaction. The isolated product is a clear, amber, slightly viscous liquid. Found, 19% Cl.

EXAMPLES 2–5

Rigid polyurethane foams are prepared using the product of Example 1, and their flame retardant properties compared to foam containing no flame retardant additives. These results are shown in Table 1.

Example 2 shows that without flame retardant additives, the rigid polyurethane foam is totally consumed (5 inches) in the ASTM D-1692 test. Examples 3–5 in Table 1 shows that when the composition of Example 1 is used at increasing levels, it decreases the extent of burn of the foam.

TABLE 1

| Composition | Example 2 | Example 3 | Example 4 | Example 5 |
| --- | --- | --- | --- | --- |
| Multranol E-9221 (Mobay)[1] | 100 | 63.3 | 40 | 13.3 |
| Composition From Example 1 | — | 36.7 | 60 | 86.7 |
| Silicone Surfactant DC 193[2] (Dow Corning) | 1.8 | 1.8 | 1.8 | 1.8 |
| Amine Catalyst Polycat 8 (Abbott)[3] | 1.0 | 1.0 | 1.0 | 1.0 |
| Tin Catalyst T-12 (M & T)[4] | 0.1 | 0.1 | 0.1 | 0.1 |
| Blowing Agent Isotron 11-B (Pennwalt)[5] | 36 | 27 | 27 | 30 |
| Mondur MR (Mobay)[6] | 125.5 | 120.8 | 117.8 | 114.3 |
| Isocyanate Index | 110 | 110 | 110 | 110 |
| Flame Retardant Properties | | | | |
| ASTM D-1692 (inches burned) | 5.0[7] | 3.6 | 2.5 | 1.2 |
| NBS Smoke Flaming (Dmc) | 108 | 87 | 59 | 64 |
| NBS Smoke Smoldering (Dmc) | 67 | 36 | 44 | 37 |

[1]Sucrose/amine based polyol, approximate hydroxyl number: 475 mg. KOH/g.
[2]A nonhydrolyzable silicone glycol copolymer.
[3]Dimethyl cyclohexylamine.
[4]Dibutyltin dilaurate.
[5]Trichlorofluoromethane with 0.25% allo-ocimene.
[6]Polymethylene Polyphenyl Isocyanate.
[7]The entire sample burned.

EXAMPLE 6

1120.0 g Niax SAS 528 sucrose/amine polyol (Union Carbide) and 47.3 g (0.79 mole) urea are added to a 2-liter 3-neck flask equipped with a thermometer, an addition funnel, a condenser, and a mechanical stirrer. The temperature of the flask is raised to 85° C.; then 232.7 g (1.58 moles) of chloral is added over 23 minutes while maintaining the temperature between 84°–86° C. The reaction mixture is heated for an additional 2 hours between 88°–89° C. in order to complete the reaction. The resulting product is a clear, amber, slightly viscous liquid. Found, 11.5% Cl.

EXAMPLE 7

Rigid polyurethane foam is prepared by using 100 parts of the composition of Example 6 and identical amounts of surfactant, catalysts, blowing agent and Mondur MR (128.2 parts) described in Example 4. The flame retardant properties found are similar to those obtained from Example 4.

EXAMPLES 8–9

A flexible high-resiliency polyurethane foam is prepared using the composition of Example 1 and its flame retardant property compared to a foam containing no flame retardant additives. These results are shown in Table 2.

TABLE 2

| Composition | Example 8 | Example 9 |
|---|---|---|
| Voranol 4701 (DOW)[1] | 60 | 60 |
| Niax 34-28 (Union Carbide)[2] | 40 | 40 |
| Composition from Example 1 | — | 1 |
| Silicone Surfactant DCF 1-1630 (Dow Corning) | 0.04 | 0.04 |
| Water | 2.7 | 2.7 |
| Diethanolamine | 1.5 | 1.5 |
| Dabco 33LV Catalyst[3] (Air Products) | 0.3 | 0.3 |
| Niax A-1 Catalyst (Union Carbide)[4] | 0.12 | 0.12 |
| Niax A-4 Catalyst (Union Carbide)[5] | 0.3 | 0.3 |
| T-12 Catalyst (M & T)[6] | 0.03 | 0.03 |
| Toluene diisocyanate (80/20 mixture of 2.4/2.6 isomers) | 35.5 | 38.9 |
| Isocyanate Index | 105 | 105 |
| Flame Retardant Property | | |
| ASTM D-1692 [Extent of Burn (in.)] | 5.0[6] | 3.0 |

[1]Polyether polyol, molecular weight approx 5000, functionality primary OH groups.
[2]Polymer polyol
[3]33% Triethylene diamine, 67% Dipropyleneglycol
[4]70% Bis(dimethylaminoethyl)ether, 30% Diluent
[5]Dibutyltin dilaurate
[6]The entire sample burned.

Example 8 shows that without flame retardant additives, this high-resiliency polyurethane foam is totally consumed (5 inches) in the ASTM D-1692 test. Example 9 shows that when only 1 part of the composition from Example 1 is incorporated into a similar 100%-TDI-based high-resiliency formulation, the flame retardancy is markedly increased.

EXAMPLE 10

324.8 g of Multranol E-9221 (Mobay) and 78.6 g (0.531 mole) of diethanolurea[1,3-bis-(2-hydroxyethyl)urea] are added to a 1-liter 3-neck flask equipped with a thermometer, an addition funnel, a condenser and a mechanical stirrer. The temperature of the flask is raised to 80° C.; 156.6 g (1.06 moles) of chloral is added over a 1-hour period while maintaining temperature between 85°–90° C. The reaction mixture is heated for an additional 2-hours in order to complete the reaction. The resulting product is a clear, amber, slightly viscous liquid. Found, 19.0% Cl.

EXAMPLE 11

Rigid polyurethane foam is prepared by using the composition of Example 10 in the following formulation:

| | Parts |
|---|---|
| Multranol E-9221 (Mobay) | 40.0 |
| Example 10 Composition | 60.0 |
| Silicone Surfactant DC 193 (Dow Corning) | 1.8 |
| Amine Catalyst Polycat 8 (Abbott) | 1.0 |
| Tin Catalyst 1-12 (M & T) | 0.1 |
| Blowing Agent Isotron 11B (Pennwalt) | 30.0 |
| Mondur MR (Mobay) 110 Index | 126.4 |

The flame and smoke properties of the resulting foam are equivalent to that found for Example 4.

EXAMPLE 12

336.0 g of Multranol E-9221 (Mobay) and 98.6 g (0.561 mole) of dipropanolurea[1,3 bis-(2-hydroxypropyl)urea] are added to a 1-liter 3-neck flask equipped with a thermometer, an addition funnel, a condenser and a mechanical stirrer; the temperature of the flask is raised to 80° C. Then 165.4 g (1.1 moles) of chloral is added over a 1-hour period keeping the temperature between 85°–90° C. The reaction mixture is heated for an additional 2-hours in order to complete the reaction. The resulting product is a clear, amber, slightly viscous liquid. Found, 19.0% Cl.

EXAMPLE 13

Rigid polyurethane foam is prepared by using the composition of Example 12 in the following formulation:

| | Parts |
|---|---|
| Multranol E-9221 (Mobay) | 40.0 |
| Example 12 Composition | 60.0 |
| Silicone Surfactant DC-193 (Dow Corning) | 1.8 |
| Amine Catalyst Polycat 8 (Abbott) | 1.0 |
| Tin Catalyst T-12 (M & T) | 0.1 |
| Blowing Agent Isotron 11B (Pennwalt) | 30.0 |
| Mondur MR (Mobay) 110 Index | 125.2 |

The flame and smoke properties of the resulting foam are equivalent to that found for Example 4.

EXAMPLE 14

391.2 g of Niax SAS 528 (Union Carbide) and 42.8 g (0.56 mole) of thiourea are added to a 1-liter 3-neck flask equipped with a thermometer, an addition funnel, a condenser and a mechanical stirrer; the temperature of the flask is then raised to 60° C. Then 166.0 g (1.1 moles) of chloral is added over a 1-hour period keeping the temperature between 60°–65° C. The reaction mixture is heated for an additional 2-hours in order to complete the reaction. The resulting product is a clear, amber, slightly viscous liquid. Found, 19.3% Cl.

EXAMPLE 15

Rigid polyurethane foam is prepared by using the composition of Example 14 in the following formulation:

| | Parts |
|---|---|
| Niax SAS 528 (Union Carbide) | 40.0 |
| Example 14 Composition | 60.0 |
| Silicone Surfactant DC 193 (Dow Corning) | 1.8 |
| Amine Catalyst Polcat 8 (Abbott) | 1.0 |
| Tin Catalyst T-12 (M & T) | 0.1 |
| Blowing Agent Isotron 11B (Pennwalt) | 27.0 |
| Mondur MR (Mobay) 110 Index | 126.0 |

The flame and smoke properties of the resulting foam are equivalent to that found for Example 4.

EXAMPLE 16

384.0 g of Multranol E-9221 (Mobay) and 53.0 g (0.55 mole) of sulfamide are added to a 1-liter 3-neck flask equipped with a thermometer, an addition funnel, a condenser and a mechanical stirrer; the temperature of the flask is raised to 80° C. Then 163.0 g (1.1 mole) of chloral is added over a 1-hour period keeping the temperature between 85°–90° C. The reaction mixture is heated for an additional 2-hours in order to complete the reaction. The resulting product is a clear amber, slightly viscous liquid. Found, 18.7% Cl.

EXAMPLE 17

Rigid polyurethane foam is prepared by using the composition of Example 16 in the following formulation:

|  | Parts |
|---|---|
| Multranol E-9221 (Mobay) | 40.0 |
| Example 16 Composition | 60.0 |
| Silicone Surfactant DC 193 (Dow Corning) | 1.8 |
| Amine Catalyst Polycat 8 (Abbott) | 1.0 |
| Tin Catalyst T-12 (M & T) | 0.1 |
| Blowing Agent Isotron 11B (Pennwalt) | 27.0 |
| Mondur MR (Mobay) 110 Index | 114.6 |

The flame and smoke properties of the resulting foam are equivalent to that found for Example 4.

We claim:

1. A process for preparing an anhydrous liquid flame retardant composition in a polyol comprising reacting 0.5 to 2.0 moles of chloral per 0.5 to 1.5 moles of a member selected from the group consisting of urea, diethanolurea, dipropanolurea, thiourea, sulfamide and mixtures thereof in the presence of a polyhydroxy composition having 2 to 8 hydroxy groups and in the absence of a catalyst.

2. The process of claim 1 wherein the chloral reaction product is 5 to 80% of the total flame retardant composition.

3. The process of claim 1 wherein the reaction is conducted at a temperature within the range of about 20° to 120° C.

4. The process of claim 1 wherein the polyhydroxy composition is selected from the group consisting of a polyether polyol, polyester polyol and mixture thereof.

5. The process of claim 1 wherein the polyhydroxy composition further comprises a compound having at least two reactive hydrogens selected from the group consisting of alkyl amine, alkylene polyamine, cyclic amine, amide and polycarboxylic acids.

6. The process of claim 1 wherein 2 moles of chloral are reacted with 1 mole of a member selected from the group consisting of urea, diethanolurea, dipropanolurea, thiourea and sulfamide.

7. The process of claim 1 wherein the polyhydroxy composition is a sucrose/amine polyol or a sucrose polyol.

8. The composition prepared by the process of claim 1.

9. The composition prepared by the process of claim 4.

10. The composition prepared by the process of claim 5.

11. The composition prepared by the process of claim 6.

12. The composition prepared by the process of claim 7.

* * * * *